May 16, 1933. E. A. HORN 1,909,404
ILLUMINATING UNIT FOR SWIMMING POOLS
Filed Nov. 29, 1930
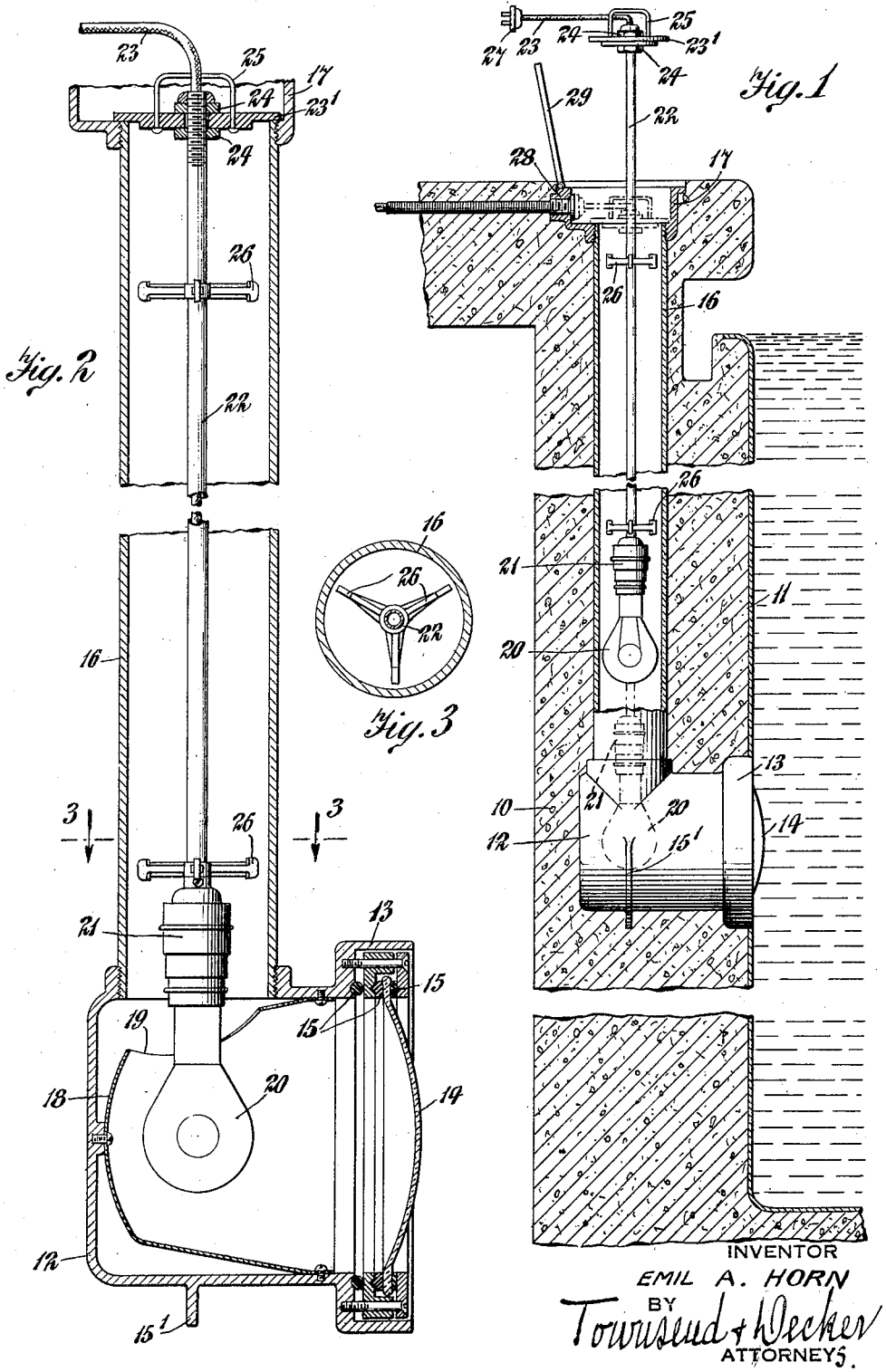
INVENTOR
EMIL A. HORN
BY
Townsend + Decker
ATTORNEYS.

Patented May 16, 1933

1,909,404

UNITED STATES PATENT OFFICE

EMIL A. HORN, OF JAMAICA, NEW YORK, ASSIGNOR TO RUSSELL & STOLL COMPANY, OF NEW YORK, N. Y., A CORPORATION OF NEW YORK

ILLUMINATING UNIT FOR SWIMMING POOLS

Application filed November 29, 1930. Serial No. 498,972.

This invention relates to illuminating devices for swimming pools or other enclosed bodies of water whereby the water throughout or substantially throughout its depth will be illuminated. In the cases of swimming pools the illumination of the water for night bathing is particularly desirable as the bathers or swimmers can at all times be seen so that they can readily be reached in case of injury or distress.

The principal object of the invention is the production of a device of the above character in which the incandescent lamp or light for any of the units, which is normally positioned beneath the normal water level, may readily be replaced, without emptying the water in the tank, should the lamp become "dead" or damaged.

Other and further objects and advantages of the invention will appear from the accompanying description taken in connection with the annexed drawing in which:

Fig. 1 is a vertical sectional view of the device (parts in elevation) applied to a wall of a swimming pool and showing the incandescent lamp or light being lowered into operative position.

Fig. 2 is an enlarged section (parts in elevation) of the device itself showing the lamp in operative position within the lamp casing.

Fig. 3 is a horizontal cross-section on the line 3—3 of Fig. 2.

Referring in detail to the several figures of the drawing:

A side wall of the swimming pool is shown at 10 and is preferably formed of concrete, the device of the invention being installed in the walls of the pool during its construction. The inner faces of the pool and its bottom are preferably lined with tile or other material as indicated at 11.

Embedded in the walls of the pool at intervals and usually considerably beneath the normal water level are the lamp housings 12 which may be of non-corrodible material as they are not exposed to the water. These housings have the usual heads 13 supporting by any suitable construction (forming no part of my invention) a lens 14 exposed to the water, the usual gaskets 15 being employed to prevent ingress of the water into the lamp housings. As the lamp housings may be constructed of a non-corrodible material, as stated, a very much cheaper material may be employed therefor than would be if they were exposed to the water and subjected to corrosion. I prefer also to secure to the lamp housings and cast therewith locking flanges 15' which are also embedded in the concrete of the walls to prevent any possible displacement of the lamp housings therein.

The lamp housings are provided with an opening in one of their sides, preferably at their upper sides, to which is connected a pipe 16 extending upwardly through the walls adjacent the top of the swimming pool and there connected with a pull box 17 which is also embedded in the concrete of the walls. It will be understood that in some cases I prefer to dispense with the pipe 16 and merely have a passageway extending through the concrete wall from the pull box to the opening in the top of the casing 12. The casing 12 is also provided with the usual reflector 18 secured therein in any manner which casing has an opening 19 registering with the opening in the top wall of the lamp housing.

The incandescent lamp or light for the housing 12 is indicated at 20, its socket being indicated at 21. Connected to the socket is a pipe 22 through which extends a flexible conducting cable 23 for supplying electric current to the lamp 20. Adjacent the upper end of the pipe 22 is a plate 23' adjustably mounted on said pipe 22 by means of the nuts 24. Said plate is adapted to seat on the upper edge of the pipe 16 when the lamp 20 has been lowered into operative position within the casing 12 through the opening in the top of the casing and through the opening 19 in the reflector. Said plate 23' is provided with a conventional form of handle 25.

The pipe 22 also carries at intervals the spiders 26 which are protective devices and which will prevent possible injury to the lamp 20 when it is being lowered into the housing 12 as they will engage against the inner side walls of the pipe 16 should the pipe 22 sway from a vertical position when the lamp is being so lowered. The conducting cable 23 carries a plug 27 adapted to engage within a socket 28 connected with a source of current supply. The pull box 17 is provided with a hinged cover plate 29 which may be closed and which, when so closed, is flush with the surface of the top wall of the swimming pool and which will then protect and prevent possible injury to the various parts of the device.

From the above description it will be apparent that I have provided a very simple and inexpensive device which will permit the relamping of the housing 12 when so desired and without the necessity of first emptying the water in the swimming pool or tank.

What I claim as my invention is:

1. In an underwater illuminating device for a body of water, a wall provided with a vertically extending opening therein extending adjacent an outer surface thereof, a lamp housing embedded in said wall and provided with an opening therein communicating with the opening in said wall, a pull box communicating with the opening in said wall, a lamp adapted to be extended through the pull box, opening in said wall and opening in said housing, a pipe attached to said lamp, a conducting cable extending through said pipe and connected to said lamp and a source of current supply and centering means on said pipe.

2. In an underwater illuminating device for a body of water, the combination of a wall for confining the body of water, said wall having a passage therein parallel to the face of the wall and protected against entry of water into the passage by an intervening thickness of the wall, said wall also having a transverse passage connecting with the first mentioned passage and opening at its outer end through the water retaining face of the wall, the outer end of the first mentioned passage having an opening through a different face of the wall, a lens at the outer end of and sealing the transverse passage against entry of water, a fixed reflector within and substantially filling the transverse passage, said reflector having an opening registering with the first mentioned passage, and a lamp connected with a source of current supply mechanically independent of the reflector, and means for supporting said lamp and introducing the same through the opening in the reflector for positioning the lamp substantially at the focal center of the reflector and for enabling the lamp to be removed through said opening without disturbing the reflector and without removal of said lens.

3. In an underwater illuminating device for a body of water, the combination of a substantially vertical wall for confining the body of water, said wall having a vertical passage therein parallel to the face of the wall and protected against entry of water into the passage by an intervening thickness of the wall, said wall also having a horizontal passage connecting with the lower end of the vertical passage and opening at its outer end through the water retaining face of the wall, the upper end of the said vertical passage having an opening through the upper face of the wall, a lens at the outer end of and sealing the horizontal passage against entry of water, a fixed reflector within and substantially filling the horizontal passage at the lower end of the vertical passage, said reflector having an opening in its upper side registering with said vertical passage, a lamp connected with a source of current supply mechanically independent of the reflector, and means for supporting said lamp and introducing the same through the opening in the reflector for positioning the lamp substantially at the focal center of the reflector and for enabling the lamp to be removed through said opening into said vertical passage without disturbing the reflector and without removal of said lens.

4. In an underwater illuminating device for a body of water, the combination of a wall for confining the body of water, said wall having a passage therein parallel to the face of the wall and protected against entry of water into the passage by an intervening thickness of the wall, said wall also having a transverse passage connecting with the first mentioned passage and opening at its outer end through the water retaining face of the wall, the outer end of the first mentioned passage having an opening through a different face of the wall, a lens at the outer end of and sealing the transverse passage against entry of water, a fixed reflector within the transverse passage, said reflector having an opening registering with the first mentioned passage, a lamp connected with a source of current supply mechanically independent of the reflector, means for supporting said lamp and introducing the same through the opening in the reflector for positioning the lamp substantially at the focal center of the reflector and for enabling the lamp to be removed through said opening without disturbing the reflector and without removal of said lens and a cover plate for the outer end of the first mentioned passage, said cover plate having the lamp supporting means secured thereto whereby the lamp will be in proper position within the reflector when the cover is in its closed position.

5. In an underwater illuminating device for a body of water, the combination of a wall for confining the body of water, said wall having a passage therein parallel to the face of the wall and protected against entry of water into the passage by an intervening thickness of the wall, said wall also having a transverse passage connecting with the first mentioned passage and opening at its outer end through the water retaining face of the wall, the outer end of the first mentioned passage having an opening through a different face of the wall, a lens at the outer end of and sealing the transverse passage against entry of water, a fixed reflector within the transverse passage, said reflector having an opening registering with the first mentioned passage, a lamp connected with a source of current supply mechanically independent of the reflector, a rigid pipe and socket for supporting said lamp and introducing the same through the opening in the reflector for positioning the lamp substantially at the focal center of the reflector for enabling the lamp to be removed through said opening without disturbing the reflector and without removal of said lens.

6. In an underwater illuminating device for a body of water, the combination of a wall for confining the body of water, said wall having a passage therein parallel to the face of the wall and protected against entry of water into the passage by an intervening thickness of the wall, said wall also having a transverse passage connecting with the first mentioned passage and opening at its outer end through the water retaining face of the wall, the outer end of the first mentioned passage having an opening through a different face of the wall, a lens at the outer end of and sealing the transverse passage against entry of water, a fixed reflector within the transverse passage, said reflector having an opening registering with the first mentioned passage, a lamp connected with a source of current supply mechanically independent of the reflector, a rigid pipe and socket for supporting said lamp and introducing the same through the opening in the reflector for positioning the lamp substantially at the focal center of the reflector for enabling the lamp to be removed through said opening without disturbing the reflector and without removal of said lens, and centering means on the pipe to space the same from the wall of the passage.

Signed at New York, in the county of New York and State of New York this 28th day of November, A. D. 1930.

EMIL A. HORN.